Figure 1:
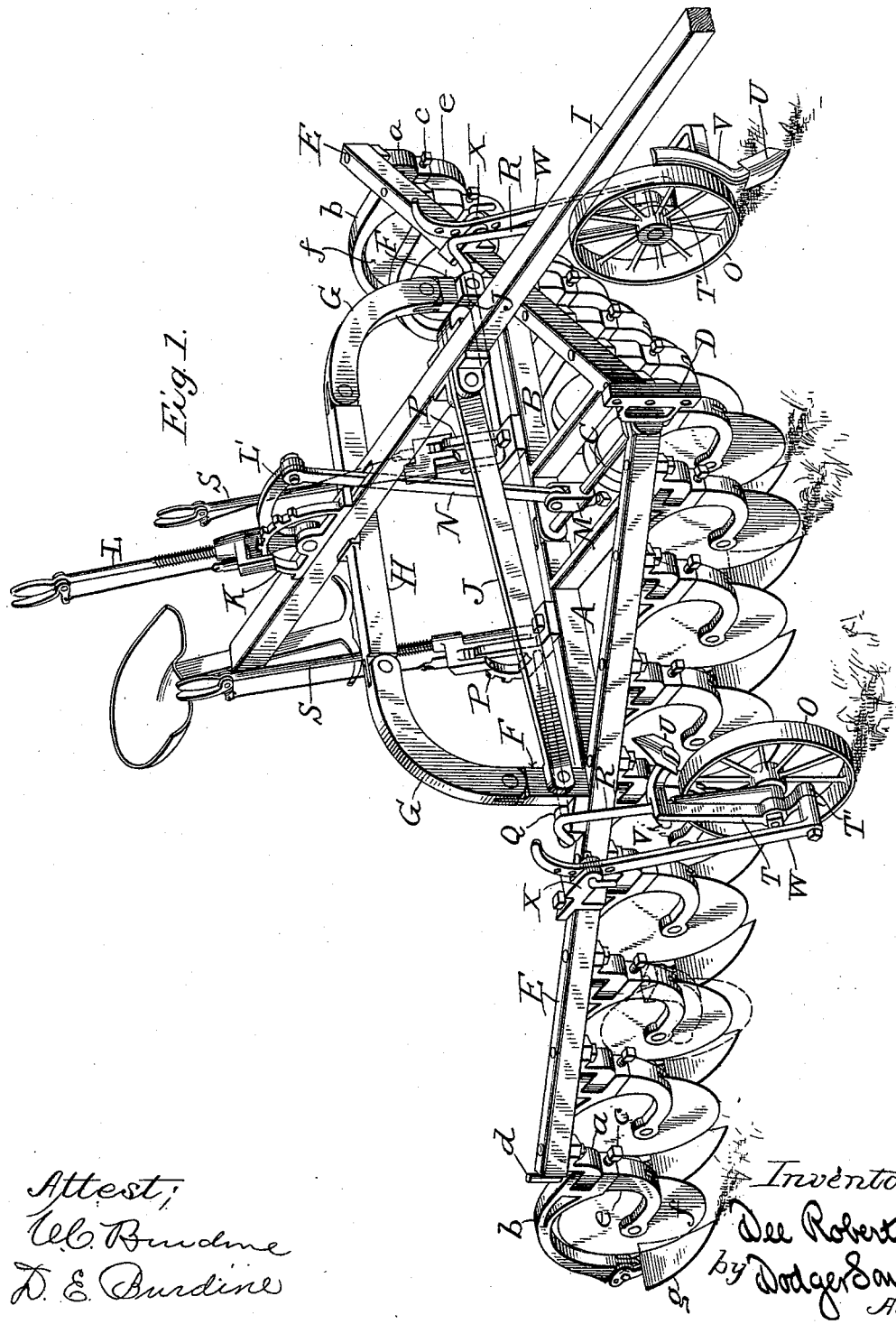

(No Model.) 2 Sheets—Sheet 1.

D. ROBERTS.
PULVERIZER.

No. 585,049. Patented June 22, 1897.

Attest:
C. C. Burdine
D. E. Burdine

Inventor:
Dee Roberts,
by Dodge Sons,
Atty's

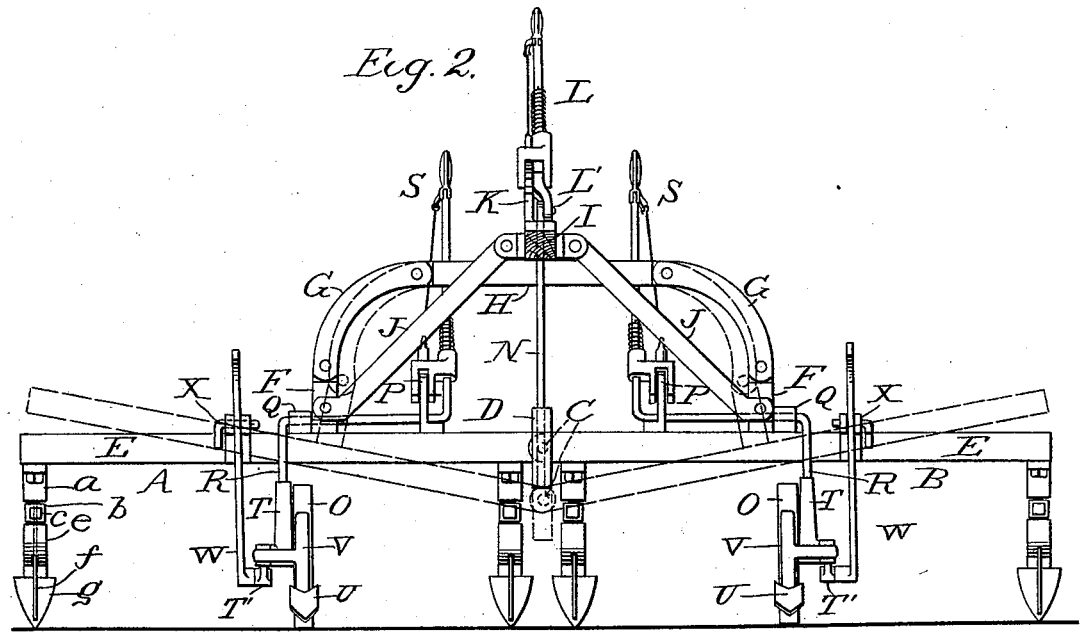
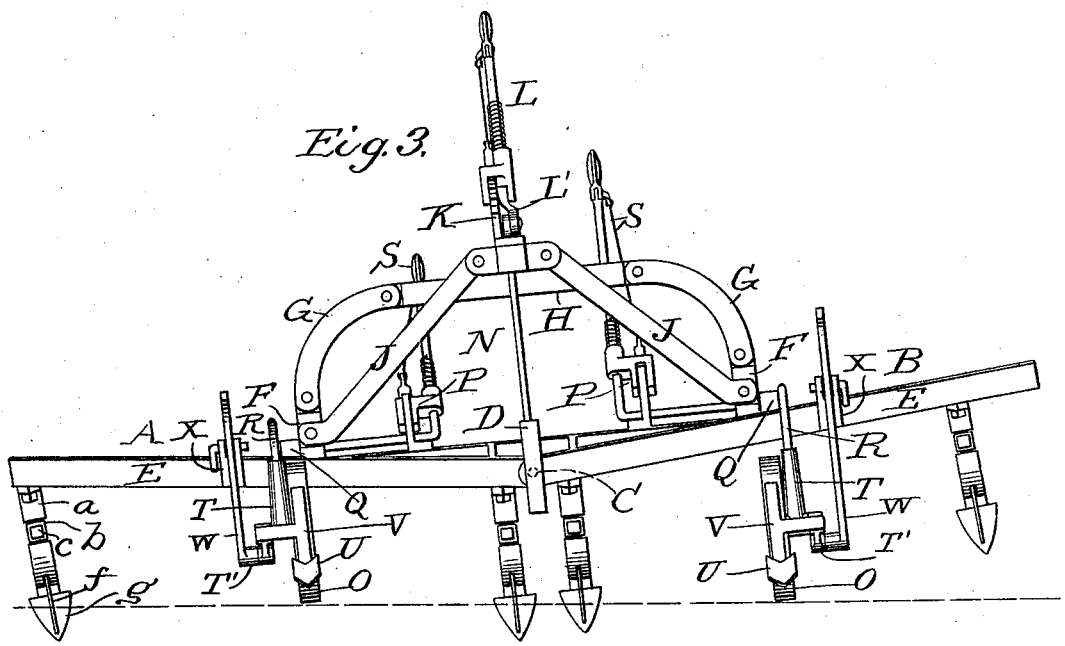

UNITED STATES PATENT OFFICE.

DEE ROBERTS, OF HAVEN, IOWA, ASSIGNOR OF TWO-THIRDS TO WALTER J. GERARD, OF SAME PLACE, AND ARTHUR S. GERARD, OF GLADBROOK, IOWA.

PULVERIZER.

SPECIFICATION forming part of Letters Patent No. 585,049, dated June 22, 1897.

Application filed December 29, 1896. Serial No. 617,363. (No model.)

*To all whom it may concern:*

Be it known that I, DEE ROBERTS, a citizen of the United States, residing at Haven, in the county of Tama and State of Iowa, have invented certain new and useful Improvements in Pulverizers, of which the following is a specification.

My present invention pertains to pulverizers, the construction and advantages of which will be hereinafter set forth, reference being had to the accompanying drawings, in which—

Figure 1 is a perspective view of my improved machine; Fig. 2, a front face view, and Fig. 3 a similar view showing one of the various adjustments of which the machine is capable.

The object of the invention is to construct the frame of the machine so that it may be adjusted to several different positions to suit the nature of the surface being worked upon; also, to bring the line of draft directly in line with the frame or body of the machine, and, further, to provide for adjustment of the colters relatively to the plow-points.

Other objects and advantages are also present and will be pointed out in the description.

The main body of the frame comprises two sections A and B, hinged together upon a rod or bar C, said bar having secured to its forward end a clevis D, to which the draft-harness is attached.

The front members or arms E E of the sections A and B stand at an angle to each other, as will be clearly seen upon reference to Fig. 1.

About midway of each arm E, preferably at the junction of the rear member of the frame thereto, I secure or form an upstanding bracket F, and these brackets are connected by curved links G G and a cross-bar H, forming, as it were, an adjustable arch. The connections of the brackets to the links and the links to the cross-bar are pivotal, so that the frame may be adjusted, as hereinafter specified.

I denotes the pole secured centrally to the cross-bar H and provided at its rear end with a seat for the operator or driver.

To the pole at a point approximately in line with the clevis are pivotally connected two links or arms J, which extend downwardly and are pivotally connected to the brackets F F, as will be seen upon reference to all the figures.

Upon the upper face of the pole is secured a segmental rack K, and a hand-lever L, provided with a forwardly-extending arm L', is pivoted thereto. A block M is adjustably mounted on the rod C, and a link or bar N connects said block M to arm L'.

Each of the sections A and B is provided with a wheel O, adjustable in relation to the frame, so that the frame as a whole may run on wheels, as indicated in Fig. 1, or either side alone may be sustained by its wheel, as indicated in Fig. 3, or both wheels may be elevated and the machine allowed to rest directly on the plows.

A segmental rack P is secured to the rear member of each of the sections A and B, and this rack, together with a journal-bearing Q, forms the support for the cranked arm R, upon the lower end of which is mounted the wheel O. A hand-lever S is mounted upon the inner end of the crank-arm R and by the proper manipulation of this lever the wheel may be elevated or depressed, as found necessary or desirable, and kept in its adjusted position.

Under some conditions it may be necessary or advantageous to provide a path-clearer for the wheels, and for that purpose I have devised a clearer which may be thrown into or out of action at will. Upon the axle of the wheel I journal an arm T, the outer end of which carries a scraper or clearer U and a guard V. The arm T is extended to the opposite side of the wheel-axle, forming a short arm T', to which is connected the adjusting-arm W. A bifurcated bracket X is secured to the bar E and carries a pin by which the arm W may be maintained in its proper position. Upon the right-hand side of Fig. 1 the clearer is shown down in its working position, while on the left it is shown elevated, in which position it is entirely out of the way.

To each of the arms or members E is secured a series of independent plows, each plow being provided with a rolling colter, which may be adjusted vertically with relation to the plow-point.

It will be noticed that each plow and its attendant colter is free to swing laterally independent of the others, and this feature is of advantage in working on uneven and stony ground.

Rearwardly-extending brackets $a$ are attached to the arms or members E throughout their length, said brackets being provided with a vertical opening.

The plow-support comprises the curved arm $b$, provided with a bifurcated head designed to fit over the bracket and having vertical openings therethrough which register with the opening in the bracket. The lower member of the bifurcated head is furnished with a set-screw $c$, which bears against the vertical stem $d$, formed integral with yoke $e$, which carries the rolling colter $f$. The plow $g$ is pivoted to the curved arm $b$ and is provided with suitable openings for the insertion of the ordinary break-pins.

Stem $d$ forms the pivot upon which the plow and colter may swing, and by loosening screw $c$ the colter may be raised or lowered and then secured in its adjusted position. Under some circumstances the working edge of the colter may be desired below the plow-point—for instance, where stalks or rubbish are to be cut.

In Fig. 1 the sections A and B are in horizontal alinement, but should it be desired to depress the center of the machine the operator throws lever L forward, which, acting through arm L', link N, block M, upon rod C, throws the frame into the position indicated by dotted lines, Fig. 2, or, if so desired, by drawing back the lever the central portion of the machine may be correspondingly elevated. When in any of these positions, either wheel may be depressed or elevated to the desired extent, so that a great variety of adjustments of the frame may be secured and the machine suited to the work contemplated.

The block M best performs its functions when directly below the pivotal connection of arm L', but it may be adjusted along rod C to any desired point.

Having thus described my invention, what I claim is—

1. In a pulverizer, the combination of the frame comprising two sections hinged together upon a rod or bar; a jointed arch pivotally connected to said sections upon opposite sides of the hinge; a pole; arms pivotally connected to said pole at a point in front of the arch and likewise connected to the hinged sections; and means for raising and lowering the hinged rod.

2. In a pulverizer, the combination of the frame comprising two sections hinged together upon a rod or bar; a jointed arch pivotally connected to said sections upon opposite sides of the hinge; a pole; arms pivotally connected to said pole at a point in front of the arch and likewise connected to the hinged sections; a rack mounted upon the pole; a lever provided with a forwardly-extending arm; and a link connecting the hinge-rod and said extending arm.

3. In a pulverizer, the combination of the frame comprising two sections hinged together upon a rod or bar; a jointed arch pivotally connected to said sections upon opposite sides of the hinge; a pole; arms pivotally connected to said pole at a point in front of the arch, and likewise connected to the hinged sections; a rack mounted upon the pole; a lever provided with a forwardly-extending arm; an adjustable block mounted on the hinge-rod; and a link connecting said block and the forwardly-extending arm.

4. In a pulverizer, the combination of the frame comprising two sections hinged together at their adjoining edges; means for elevating and depressing said hinge-joint; a wheel connected to each of said sections; and means for independently adjusting said wheels.

5. In a pulverizer, the combination of the frame comprising two sections hinged together at their adjoining edges; and a series of independent pivoted plows mounted upon the said sections.

6. In combination with the frame and its wheel; a clearer comprising a plow U and guard V carried by an arm T, journaled upon the wheel-axle; a short arm T' connected to arm T and extending upon the opposite side of the axle; an arm W connected to said short arm T'; and means for holding the arm W in its adjusted position.

7. In combination with the frame; a rearwardly-extending bracket secured thereto and provided with a vertical opening; a plow-point carried by a curved arm, said arm having a bifurcated head designed to fit over the bracket; openings in said head designed to register with the opening in the bracket; a colter carried by a yoke; a stem extending upwardly from said yoke and passing through the openings in the head and bracket; and means for securing said stem.

In witness whereof I hereunto set my hand in the presence of two witnesses.

DEE ROBERTS.

Witnesses:
JOHN E. EATON,
FRANK L. BROWN.